US012529422B2

United States Patent
Schorn et al.

(10) Patent No.: US 12,529,422 B2
(45) Date of Patent: Jan. 20, 2026

(54) GEAR-CHANGE SELECTOR MODULE FOR A GEARSHIFT

(71) Applicant: VALEO POWERTRAIN GMBH, Ebern (DE)

(72) Inventors: Andreas Schorn, Ebern (DE); Ralph Berger, Ebern (DE); Ho-Seon Park, Ebern (DE); Karlheinz Müller, Ebern (DE); Dieter Grimmer, Ebern (DE)

(73) Assignee: VALEO POWERTRAIN GMBH, Ebern (DE)

( * ) Notice: Subject to any disclaimer, the term of this patent is extended or adjusted under 35 U.S.C. 154(b) by 0 days.

(21) Appl. No.: 18/709,570

(22) PCT Filed: Dec. 13, 2022

(86) PCT No.: PCT/EP2022/085499
§ 371 (c)(1),
(2) Date: May 13, 2024

(87) PCT Pub. No.: WO2023/110803
PCT Pub. Date: Jun. 22, 2023

(65) Prior Publication Data
US 2025/0003487 A1  Jan. 2, 2025

(30) Foreign Application Priority Data
Dec. 14, 2021  (DE) ............... 10 2021 133 066.1

(51) Int. Cl.
*F16H 63/32* (2006.01)
(52) U.S. Cl.
CPC ....... *F16H 63/32* (2013.01); *F16H 2063/321* (2013.01); *F16H 2063/325* (2013.01)

(58) Field of Classification Search
CPC ...... F16H 63/30; F16H 63/3023; F16H 63/32; F16H 2063/321; F16H 2063/325
See application file for complete search history.

(56) References Cited

FOREIGN PATENT DOCUMENTS

DE   202013103202 U1 * 9/2013 ............. F16H 63/32
DE   202015104756 U1 * 1/2017 ............. F16H 63/30
(Continued)

OTHER PUBLICATIONS

International Search report issued Feb. 24, 2023 in PCT/EP2022/085499, filed on Dec. 13, 2022, 3 pages.
(Continued)

*Primary Examiner* — Bobby Rushing, Jr.
(74) *Attorney, Agent, or Firm* — Oblon, McClelland, Maier & Neustadt, L.L.P.

(57) ABSTRACT

A gear-change selector module for a gearshift of a motor vehicle has a movable element and a shift fork having a carrier arm which engages in a recess of the movable element. The recess has two actuating faces which cooperate with carrier faces of the carrier arm. Viewed in a section running through the centre axis of the movable element and the centre axis of the recess, the actuating faces are each convex in a first portion extending from the centre axis in the direction of the outside of the movable element. Furthermore, viewed in a section running through the centre axis of the movable element and the centre axis of the recess, the carrier faces each extend in a first portion from radially outside the movable element up to the centre axis of the movable element, and in a second portion from the centre axis in the direction of the free end of the carrier arm. The carrier faces are convex in the second portion.

20 Claims, 2 Drawing Sheets

(56) References Cited

FOREIGN PATENT DOCUMENTS

| DE | 102017108030 A1 | * | 10/2018 | ............. F16H 63/30 |
| DE | 102018009853 A1 | * | 6/2020 | .......... F15B 13/0807 |
| JP | 2009-144852 A | | 7/2009 | |
| JP | 2011-027173 A | | 2/2011 | |
| JP | 2011027173 A1 | * | 2/2011 | ......... F16H 63/3023 |

OTHER PUBLICATIONS

German Search Report issued Jul. 7, 2022 in DE application 10 2021 133 066.1, filed on Dec. 14, 2021, 6 pages (with English Translation of Categories of Cited Documents).

* cited by examiner

GEAR-CHANGE SELECTOR MODULE FOR A GEARSHIFT

BACKGROUND OF THE INVENTION

Field of the Invention

The invention concerns a gear-change selector module for a gearshift of a motor vehicle, with a housing, a movable element and a shift fork having a carrier arm which engages in a recess of the movable element.

Description of the Related Art

Gear-change selector modules are parts of a transmission mechanism. They serve to create the adjustment movement for shifting between different gears of the transmission. Normally, gear-change selector modules contain several movable elements which can be moved into receivers under hydraulic or electromechanical actuation in order to engage different gears. The stroke of this movable element is transmitted to different shift forks, which are coupled to shift collars of the transmission, in order to move these axially. In this way, different gear stages are activated or deactivated. The shift forks are coupled to the movable elements via carrier arms which engage in recesses in the movable elements. The force is transmitted via carrier faces of the carrier arms which lie against actuating faces of the recesses.

During operation of the gear-change selector modules, the carrier arms of the shift forks deform on actuation due to the unavoidable material elasticity. This leads to a tilt moment on the movable element which pushes the movable element out of its coaxial position with the receiver and hence causes a greater wear on the contact faces between the movable element and the receiver. Also, with hydraulically actuated movable elements, because of the asymmetric load, the tilt moment has a negative effect on the tightness of the seals of the movable element, in particular at low temperatures.

BRIEF SUMMARY OF THE INVENTION

It is an object of the invention to provide a gear-change selector module which avoids an uneven load of the movable element and hence tilt moments acting on the movable element.

This object is achieved by gear-change selector module for a gearshift of a motor vehicle, with a housing, a movable element and a shift fork having a carrier arm which engages in a recess of the movable element. The recess extends from an outside of the movable element into this, beyond its centre axis or centre longitudinal axis, in a direction perpendicular to the centre axis of the movable element. The recess has two actuating faces which lie opposite one another in the axial direction and cooperate with carrier faces arranged on sides of the carrier arm facing away from one another. Furthermore, viewed in a section running through the centre axis of the movable element and the centre axis of the recess, the actuating faces are each convex in a first portion extending from the centre axis in the direction of the outside of the movable element. Viewed in a section running through the centre axis of the movable element and the centre axis of the recess, the carrier faces each extend in a first portion from radially outside the movable element up to the centre axis of the movable element, and in a second portion from the centre axis in the direction of the free end of the carrier arm. The carrier faces are convex in the second portion. It has been found that, in contrast to the prior art in which the actuating faces and carrier faces are flat or level, with the gear-change selector module configured according to the invention, the tilt moments acting on the movable element in operation are reduced. The curved actuating and carrier faces here ensure in particular that the contact faces can roll on one another and thereby the theoretical contact point wanders very much less in the radial direction on deformation of the carrier arm than is the case with contact faces which are flat in the starting state. Because of the rolling, the forces are transmitted from the actuating faces in the movable element to the carrier faces of the carrier arm mainly centrally, i.e. in the region of the centre axis.

Viewed in a section running through the centre axis of the movable element and the centre axis of the recess, the first portions of the actuating faces may each have a first radius of less than 50 mm. In this way, it is guaranteed that the carrier arm has enough clearance to bend in the first portions when the shift fork is actuated.

In one embodiment, the first radius is between 10 mm and 34 mm, in particular between 20 mm and 24 mm. This ensures that the carrier faces in the first portion always lie against the actuating faces in defined fashion in order to avoid tilt moments.

In a further embodiment, viewed in a section running through the centre axis of the movable element and the centre axis of the recess, the first portions of the carrier faces are each concave and have a radius which is at least as great as the first radius. In the sense of the invention, at least one of the first portions of the carrier faces may have a radius which tends towards infinity, so that the associated first portion is substantially flat. This has the advantage that in the first portions, the carrier arm can bend under load such that tilt moments have no effect or only a slight effect on the movable element.

It may furthermore be provided that, viewed in a section running through the centre axis of the movable element and the centre axis of the recess, the second portions of the carrier faces each have a second radius of less than 200 mm. Thus in the second portions, the carrier arm has sufficient clearance to bend on actuation of the shift fork.

In one embodiment, the second radius may be between 50 mm and 140 mm, in particular between 90 mm and 100 mm. This design ensures that the carrier faces in the first portion always lie on the actuating faces in defined fashion in order to avoid tilt moments.

According to one embodiment, viewed in a section running through the centre axis of the movable element and the centre axis of the recess, the actuating faces are each flat in a second portion extending from the centre axis away from the first portion of the actuating faces, in particular perpendicular to the centre axis of the movable element. Thus the clearance between the actuating faces and the carrier faces in the second portion is sufficiently large to avoid tilt moments when the shift fork bends during actuation.

According to one embodiment, viewed in a section running through the centre axis of the movable element and the centre axis of the recess, the centre axis of the movable element intersects the carrier faces such that the radial extent of the first portion of the carrier face amounts to maximum 500% of the radial extent of the second portion of the corresponding carrier face. This ensures that the carrier arm protrudes into the recesses sufficiently far beyond the centre axis of the movable element that the forces are reliably transmitted from the actuating faces centrally to the carrier faces when the shift fork is actuated by means of the movable element.

Alternatively or additionally, viewed in a section running through the centre axis of the movable element and the centre axis of the recess, the actuating faces may each have a second portion. Here, viewed in a section running through the centre axis of the movable element and the centre axis of the recess, the centre axis of the movable element intersects the actuating faces such that the radial extent of the first portion of the actuating face amounts to maximum 300% of the radial extent of the second portion of the corresponding actuating face. Thus the actuating faces are arranged relative to the centre axis such that sufficient contact area is available for the carrier faces both in the first portions and in the second portions, in order to reliably ensure that the actuating forces are transmitted centrally.

Furthermore, it may be provided that, viewed in a section running through the centre axis of the movable element and the centre axis of the recess, the actuating faces each have a second portion. Here, the first portion of the actuating faces and carrier faces transforms into the second portion of the corresponding actuating face or carrier face without an edge or step. Thus it is ensured that the forces acting on the movable element during operation do not change suddenly when the shift fork bends, and thereby cause a change of the regions in which the carrier faces lie against the actuating faces.

BRIEF DESCRIPTION OF THE SEVERAL VIEWS OF THE DRAWINGS

Further advantages and features will become apparent from the following description and from the appended drawings, in which.

DETAILED DESCRIPTION OF THE INVENTION

Figure 1:
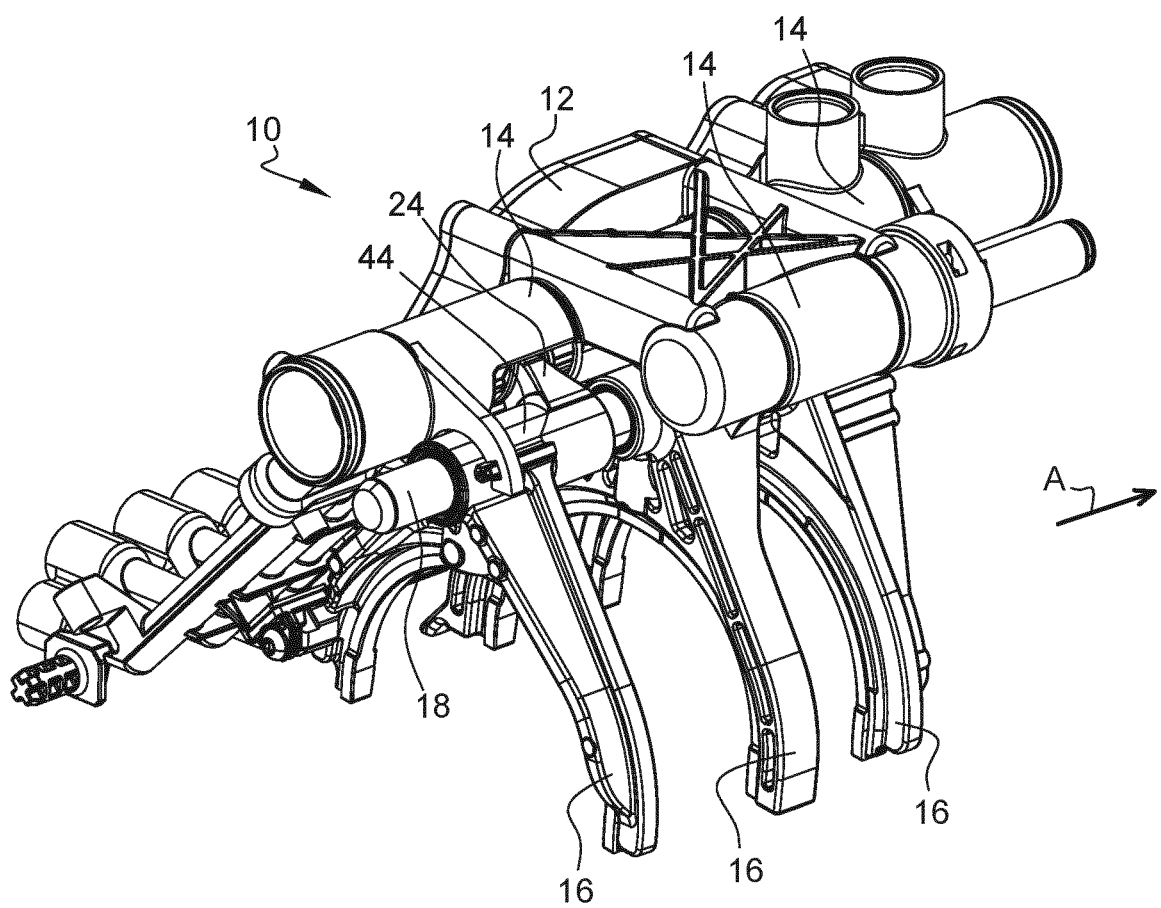
FIG. 1 shows a perspective illustration of a gear-change selector module according to the invention with several movable elements and shift forks.

FIG. 1 shows a gear-change selector module 10 for a gearshift of a motor vehicle, which has a housing 12 with actuators 14 and several shift forks 16 which can be moved by means of the actuators 14 in the axial direction A on a shaft 18 of the gear-change selector module 10.

The actuators 14 each have a receiver 20 (see FIG. 2) and a movable element 22 which is mounted in the receiver 20 so as to be movable both in and against the axial direction A.

The actuators 14 are here each coupled to one of the shift forks 16 via a carrier arm 24 of the shift fork 16, which engages radially in a recess 26 in the movable element 22.

In the present embodiment, the actuators 14 are hydraulic cylinders, the movable elements 22 are accordingly actuator pistons, and the receivers 20 are piston receivers.

In an alternative embodiment, the actuators may be electro-mechanically operated. In this case, the movable elements 22 are e.g. actuating elements, and the receivers 20 are guides in which the actuating elements are guided accordingly.

Figure 2:
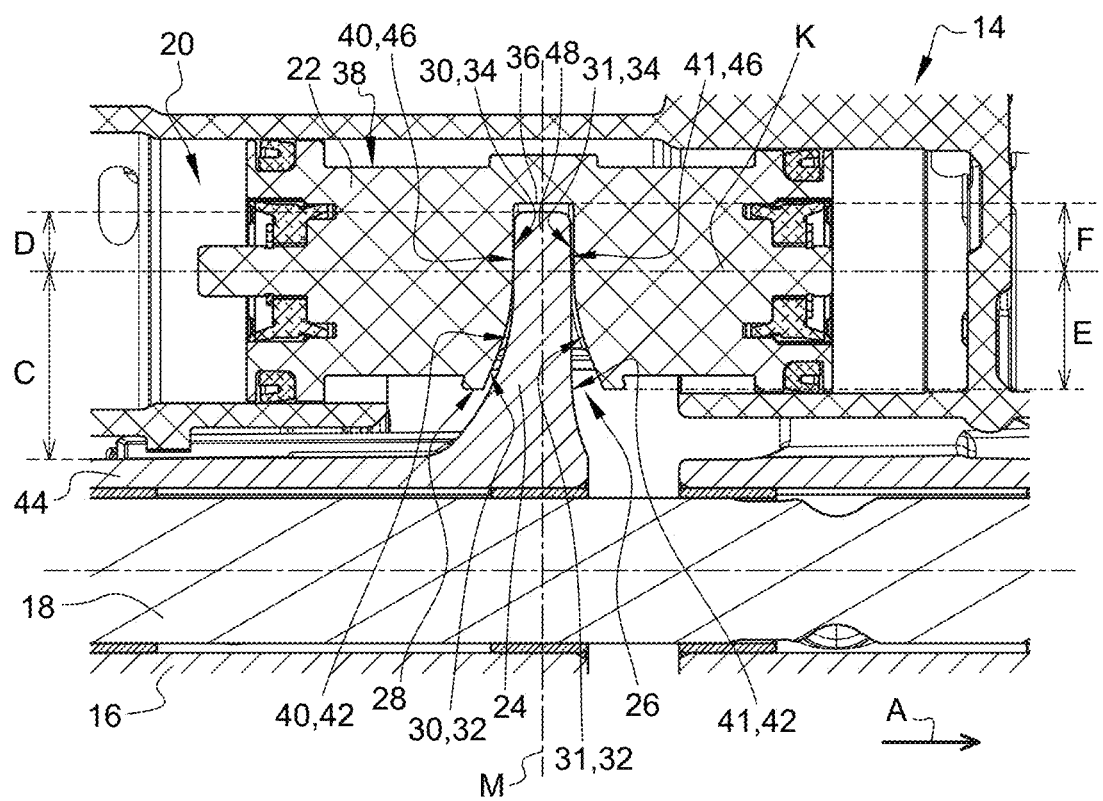
FIG. 2 shows a section through a movable element and a shift fork coupled to the movable element of the gear-change selector module from FIG. 1.
Figure 3:
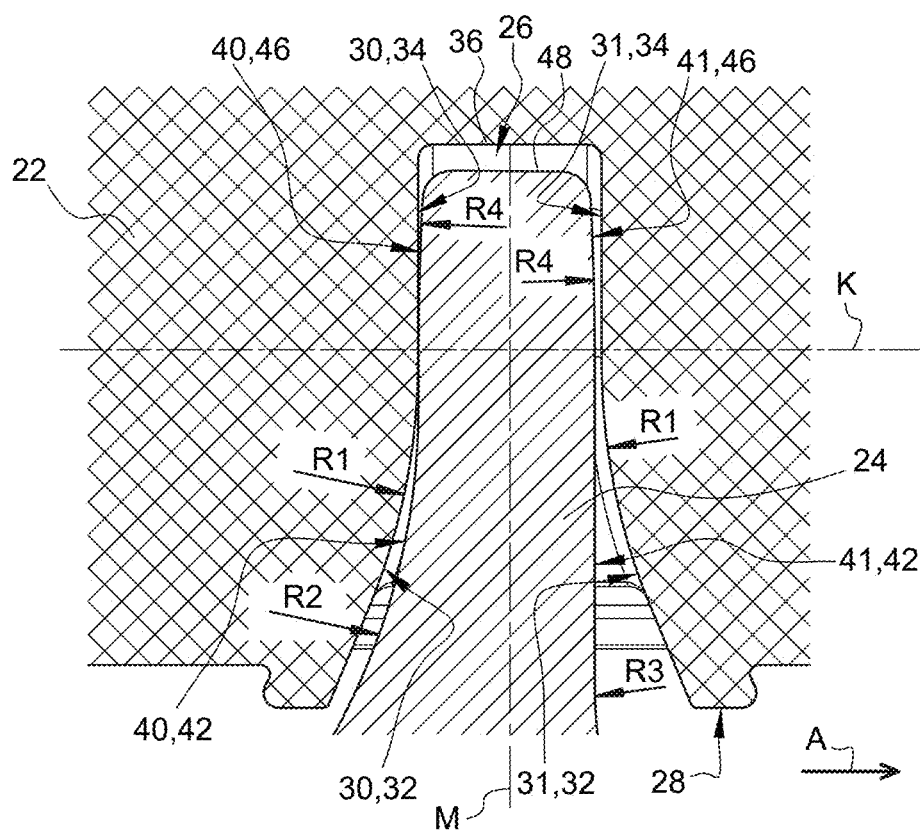
FIG. 3 shows, in a detail view of FIG. 2, a carrier arm of the shift fork which engages in a recess of the movable element.

With reference to FIGS. 2 and 3, which each show a section through the centre axis K of the movable element 22 and the centre axis M of the recess 26, it is explained below how the coupling is configured using the example of an actuator-shift fork pair 14, 16.

The recess 26 extends from an outside 28 of the movable element 22 facing the shift fork 16 radially into the movable element 22, and beyond the centre axis K of the movable element 22.

The recess 26 here has two actuating faces 30, 31 which lie opposite one another in the axial direction A and each extend in a first portion 32 from the outside 28 up to the centre axis K, and in a second portion 34 from the centre axis K up to an end 36 of the recess 26.

In the present exemplary embodiment, the end 36 is formed by a base of the recess 26. In an alternative embodiment, the end 36 may be designed arbitrarily, for example as an opening on the outside 38 of the movable element 22 facing away from the shift fork 16.

The first portion 32 here transforms constantly into the second portion 34, i.e. without a jump or step and without forming an edge.

Furthermore, the first portion 32 of the actuating faces 30, 31 is formed convex and in each case extends with a radius R1 of 22 mm from the outside 28 up to the centre axis K.

In an alternative embodiment, only a part of the first portion 32 of the actuating faces 30, 31 may be formed convex, for example if a chamfer is provided at the transition to the outside 28.

In all embodiments, the actuating faces 30, 31 are however formed convex in the first portion 32, i.e. at least in a portion of the first portion 32.

Furthermore, in a further embodiment, the radius R1 may be of any size. Preferably however, the radius R1 is less than 50 mm or between 10 mm and 34 mm, in particular between 20 mm and 24 mm.

In the present exemplary embodiment, the second portion 34 of the actuating faces 30, 31 is flat and extends perpendicularly to the centre axis K, from the centre axis K up to the end 36 of the recess 26.

In an alternative embodiment, only a part of the second portion 34 of the actuating faces 30, 31 may be formed flat.

In principle, the actuating faces 30, 31 may be configured differently from one another. For example, in one embodiment, the radius R1 of the actuating face 30 may differ from the radius R1 of the actuating face 31.

The edges which form the transition between the actuating faces 30, 31 and the end 36 of the recess 26 here have a rounding, but this is not significant for the coupling function.

The carrier arm 24 has two carrier faces 40, 41, which are arranged opposite one another in the axial direction A and each lie opposite one of the actuating faces 30, 31 in the recess 26 and cooperate therewith when the movable element 22 is moved in or against the axial direction A, in order to actuate the shift fork 16 and move this accordingly on the shaft 18.

The carrier faces 40, 41 here extend in the first portion 42 from a base body 44 of the shift fork 16 arranged outside the movable element 22, radially up to the centre axis K of the movable element 22, and in a second portion 46 from the centre axis K up to a free end 48 of the carrier arm 24.

The first portion 42 here transforms constantly into the second portion 46, i.e. without a jump or step and without forming an edge.

Furthermore, here the first portion 42 of the carrier face 40 is concave and extends with a radius R2 of 24 mm from the base body 44 to the centre axis K, while the first portion 42 of the carrier face 41 is concave and extends with a radius R3 of 200 mm from the base body 44 to the centre axis K.

In an alternative embodiment, only a part of the first portion 42 of the carrier faces 40, 41 may be formed concave.

In principle, the carrier faces 40, 41 may each be shaped arbitrarily in the first portion 42.

Preferably however, at least the carrier face 40 is formed concave in the first portion 42, i.e. at least in a portion of the first portion 42.

Furthermore, in a further embodiment, the radii R2, R3 may be of arbitrary size, in particular at least as great as the radius R1 of the correspondingly opposite actuating face 30, 31.

The second portion 46 of each carrier face 40, 41 is convex and extends with a radius R4 of 95 mm from the centre axis K up to the free end 48 of the carrier arm 24.

In an alternative embodiment, only a part of the second portion 46 of the carrier faces 40, 41 may be formed convex.

In all embodiments, the carrier faces 40, 41 are however formed convex in the second portion 46, i.e. at least in a portion of the second portion 46.

Furthermore, in a further embodiment, the radius R4 may be of any size. Preferably however, the radius R4 is less than 200 mm or between 50 mm and 140 mm, in particular between 90 mm and 100 mm.

In principle, the carrier faces 40, 41 may be configured differently from one another. For example, in one embodiment, the radius R4 of the carrier face 40 may differ from the radius R4 of the carrier face 41.

The edges which form the transition between the carrier faces 40, 41 and the free end 48 of the carrier arm 24 here have a rounding, which is provided however in addition to the convex portion of the second portion 46 and is of no further significance in particular for the coupling of the movable element 22 and the shift fork 16.

The ratio of the radial extent C of the first portion 42 to the radial extent D of the second portion 46, in the carrier faces 40, 41 of the present exemplary embodiment, is approximately 3:1, i.e. the first portion 42 is around three times as long as the second portion 46 in the radial direction.

In principle, the ratio of the radial extent C of the first portion 42 to the radial extent D of the second portion 46 may be of arbitrary amount.

In one embodiment, the radial extent C of the first portion 42 is maximum five times as great as the radial extent D of the second portion 46.

The ratio of the radial extent E of the first portion 32 to the radial extent F of the second portion 34, in the actuating faces 30, 31 of the present exemplary embodiment, is approximately 2:1, i.e. the first portion 32 is around twice as long as the second portion 34 in the radial direction.

In principle, the ratio of the radial extent E of the first portion 32 to the radial extent F of the second portion 34 may of arbitrary amount.

In one embodiment, the radial extent E of the first portion 32 is maximum three times as great as the radial extent F of the second portion 34.

On operation of the shift fork 16 in the axial direction A, the shift fork 16 lies with the carrier face 40 on the actuating face 30 of the movable element 22. Here, the force is transmitted from the movable element 22 to the shift fork 16 in the region of the centre axis K of the movable element 22 and in the direction of the centre axis K.

The same applies on operation of the shift fork against the axial direction A, in which the shift fork 16 lies with the carrier face 41 against the actuating face 31 of the movable element 22.

Even under high loads in which the carrier arm of the shift fork 16 deforms because of the unavoidable material elasticity, the curved actuating faces 30, 31 in connection with curved carrier faces 40, 41 guarantee that the carrier faces 40, 41 can roll on the actuating faces 30, 31 and hence the force is transmitted from the movable element 22 to the shift fork 16 in the region of the centre axis K.

In this way, tilt moments on the movable element 22 are reduced or avoided.

This provides a gear-change selector module 10 which ensures a defined coupling of the shift forks 16 to the movable elements 22 even under high load.

The invention claimed is:

1. A gear-change selector module for a gearshift of a motor vehicle, comprising:
    a housing,
    a movable element movable in an axial direction, and
    a shift fork having a carrier arm which engages in a recess of the movable element,
    wherein the recess extends from an outside of the movable element into the movable element, beyond a center axis of the movable element in a direction perpendicular to the center axis,
    wherein the recess has two actuating faces which lie opposite one another in the axial direction and cooperate with carrier faces arranged on sides of the carrier arm facing away from one another,
    wherein when viewed in a section running through the center axis of the movable element and the center axis of the recess, the actuating faces are each convex in a first portion extending from the center axis in the direction of the outside of the movable element,
    and wherein when viewed in a section running through the center axis of the movable element and the center axis of the recess, the carrier faces each extend in a first portion from radially outside the movable element up to the center axis of the movable element, and in a second portion beyond the center axis of the movable element, with the carrier faces being convex only in the second portion.

2. The gear-change selector module according to claim 1, wherein when viewed in a section running through the center axis of the movable element and the center axis of the recess, the first portions of the actuating faces each have a first radius of less than 50 mm.

3. The gear-change selector module according to claim 2, wherein when viewed in a section running through the center axis of the movable element and the center axis of the recess, the second portions of the carrier faces each have a second radius of less than 200 mm.

4. The gear-change selector module according to claim 2, wherein when viewed in a section running through the center axis of the movable element and the center axis of the recess, the actuating faces are each flat in a second portion extending from the center axis away from the first portion of the actuating faces, in particular perpendicular to the center axis of the movable element.

5. The gear-change selector module according to claim 2, wherein when viewed in a section running through the center axis of the movable element and the center axis of the recess, the center axis of the movable element intersects the carrier faces such that the radial extent of the first portion of the carrier face amounts to maximum 500% of the radial extent of the second portion of the corresponding carrier face.

6. The gear-change selector module according to claim 2, wherein when viewed in a section running through the center axis of the movable element and the center axis of the recess, the actuating faces each have a second portion, wherein when viewed in a section running through the center axis of the movable element and the center axis of the recess, the center axis of the movable element intersects the actuating faces such that the radial extent of the first portion of the actuating face in each case amounts to maximum 300% of the radial extent of the second portion of the corresponding actuating face.

7. The gear-change selector module according to claim 2, wherein when viewed in a section running through the center axis of the movable element and the center axis of the recess, the actuating faces each have a second portion, wherein each first portion of the actuating faces and of the carrier faces respectively transforms into the second portion of the corresponding actuating face of and the second portion of the corresponding carrier face without an edge or step.

8. The gear-change selector module according to claim 2, wherein the first radius is between 10 mm and 34 mm, in particular between 20 mm and 24 mm.

9. The gear-change selector module according to claim 8, wherein when viewed in a section running through the center axis of the movable element and the center axis of the recess, the first portions of the carrier faces are each concave and have a radius which is at least as great as the first radius.

10. The gear-change selector module according to claim 8, wherein when viewed in a section running through the center axis of the movable element and the center axis of the recess, the second portions of the carrier faces each have a second radius of less than 200 mm.

11. The gear-change selector module according to claim 8, wherein when viewed in a section running through the center axis of the movable element and the center axis of the recess, the actuating faces are each flat in a second portion extending from the center axis away from the first portion of the actuating faces, in particular perpendicular to the center axis of the movable element.

12. The gear-change selector module according to claim 8, wherein when viewed in a section running through the center axis of the movable element and the center axis of the recess, the center axis of the movable element intersects the carrier faces such that the radial extent of the first portion of the carrier face amounts to maximum 500% of the radial extent of the second portion of the corresponding carrier face.

13. The gear-change selector module according to claim 8, wherein when viewed in a section running through the center axis of the movable element and the center axis of the recess, the actuating faces each have a second portion, wherein when viewed in a section running through the center axis of the movable element and the center axis of the recess, the center axis of the movable element intersects the actuating faces such that the radial extent of the first portion of the actuating face in each case amounts to maximum 300% of the radial extent of the second portion of the corresponding actuating face.

14. The gear-change selector module according to claim 2, wherein when viewed in a section running through the center axis of the movable element and the center axis of the recess, the first portions of the carrier faces are each concave and have a radius which is at least as great as the first radius.

15. The gear-change selector module according to claim 1, wherein when viewed in a section running through the center axis of the movable element and the center axis of the recess, the second portions of the carrier faces each have a second radius of less than 200 mm.

16. The gear-change selector module according to claim 15, wherein the second radius is between 50 mm and 140 mm, in particular between 90 mm and 100 mm.

17. The gear-change selector module according to claim 1, wherein when viewed in a section running through the center axis of the movable element and the center axis of the recess, the actuating faces are each flat in a second portion extending from the center axis away from the first portion of the actuating faces, in particular perpendicular to the center axis of the movable element.

18. The gear-change selector module according to claim 1, wherein when viewed in a section running through the center axis of the movable element and the center axis of the recess, the center axis of the movable element intersects the carrier faces such that the radial extent of the first portion of the carrier face amounts to maximum 500% of the radial extent of the second portion of the corresponding carrier face.

19. The gear-change selector module according to claim 1, wherein when viewed in a section running through the center axis of the movable element and the center axis of the recess, the actuating faces each have a second portion, wherein when viewed in a section running through the center axis of the movable element and the center axis of the recess, the center axis of the movable element intersects the actuating faces such that the radial extent of the first portion of the actuating face in each case amounts to maximum 300% of the radial extent of the second portion of the corresponding actuating face.

20. The gear-change selector module according to claim 1, wherein when viewed in a section running through the center axis of the movable element and the center axis of the recess, the actuating faces each have a second portion, wherein each first portion of the actuating faces and of the carrier faces respectively transforms into the second portion of the corresponding actuating face and the second portion of the corresponding carrier face without an edge or step.

* * * * *